(12) United States Patent
Lamberg et al.

(10) Patent No.: US 6,408,000 B1
(45) Date of Patent: Jun. 18, 2002

(54) MULTICAST DATA DISTRIBUTION SYSTEM

(75) Inventors: Michael J. Lamberg, Massapequa Park; Andrew F. Bach, Seaford, both of NY (US)

(73) Assignee: Securities Industry Automation Corporation, Brooklyn, NY (US)

( * ) Notice: Subject to any disclaimer, the term of this patent is extended or adjusted under 35 U.S.C. 154(b) by 0 days.

(21) Appl. No.: 09/535,114

(22) Filed: Mar. 24, 2000

(51) Int. Cl.[7] ............................. H04L 12/28; H04L 1/22
(52) U.S. Cl. .................... 370/390; 370/432; 714/11
(58) Field of Search ................. 370/216, 219, 370/242, 244, 248, 252, 390, 389, 432; 714/2, 6, 11, 25

(56) References Cited

U.S. PATENT DOCUMENTS 5,436,886 A * 7/1995 McGill ....................... 370/219
5,926,463 A   7/1999 Ahearn et al. ............... 370/254
6,201,808 B1 * 3/2001 Wang et al. ................ 370/390

OTHER PUBLICATIONS

Aggarwal et al, "Dualcast: A Scheme for Reliable Multicasting", Network Protocols, 1994, pp. 15–22.*
"Wall Street Takes Stock of IP Multicast", A. Francis Bach, Business Communications Review, Jan. 1998, pp. 48–52.
"The Use of IP Multicasting to Disseminate Market Data Information", A. Francis Bach, WSTA Ticker, Sep./Oct. 1997.

* cited by examiner

Primary Examiner—Wellington Chin
Assistant Examiner—Maikhanh Tran
(74) Attorney, Agent, or Firm—Baker Botts

(57) ABSTRACT

A data distribution system having multicast packet replicators supplying redundant packets for distribution from redundant facilities is provided with an improvement wherein the redundant packets are provided via separate local area network interface ports and have different source addresses.

5 Claims, 2 Drawing Sheets

MULTICAST DATA DISTRIBUTION SYSTEM

BACKGROUND OF THE INVENTION

This invention relates to systems for automatically electronically distributing information. In particular, the invention is described with respect to a system for distributing securities market information using electronic transmission.

Securities Industry Automation Corporation (SIAC), the assignee of this application, collects and distributes trade and quote data for the U.S. stock and options markets. The data has been distributed using the system depicted in FIG. 1 and is also described in an article entitled "Wall Street Takes Stock of IP Multicast" by A. Francis Bach published in BUSINESS COMMUNICATIONS REVIEW, January, 1998.

As depicted in FIG. 1 the current system includes two sites from which data is transmitted to provide redundancy and resistance to system failure. One site, "site B", is located at SIAC's facility in Brooklyn, N.Y. The other site, "site A", is located at 55 Water Street, New York, N.Y. Site A includes Option Price Reporting Authority (OPRA) system 12, which is a tandem computer which is operated by SIAC to gather and distribute option trade and quote information from all U.S. option exchanges on behalf of the Options Price Reporting Authority consortium. A similar system 16 is provided at site B. Systems 12 and 16 provide redundant capabilities so that if there is a failure of system 12, the tasks normally performed by system 12 will be performed by system 16, and vice versa. In addition to option price reporting, SIAC provides reporting of the stock trading activities on behalf of the Consolidated Tape Association consortium, including a Consolidated Tape System (CTS) which reports trades and a Consolidated Quote System (CQS) which reports quotations. These systems collect, integrate and distribute listed securities' trade and quote data from the New York Stock Exchange (NYSE), the American Stock Exchange (AMEX), the National Association of Securities Dealers (NASDAQ) and the regional exchanges. Systems 14 and 18 normally provide the CQS service and the CTS service, respectively, but each system has have the capability to assume operations on behalf of the other system in the event of a system failure.

In addition to the redundancy of computers 12, 14, 16, 18, there is provided further redundancy in connection with the distribution of information to the users. In particular each of computers 12, 14, 16 and 18 includes a primary network interface (P) and a backup network interface (B). Each interface is connected to a multicast packet replicator 20 which provides duplicated packet outputs to a local area network through source router 22. One packet is supplied to a distribution router 24A at site A, and the other packet is provided to another distribution packet router 24B at site B via the local area network. Communication of the replicated packets between the sites are provided using an optical cable system.

Distribution routers 24A and 24B at each of the sites distribute identical packet streams called stream A and stream B to users 26 to provide for redundancy in the event of a communications or equipment failure. Further redundancies are built into the system. For example, in the event of a failure in one of the multicast packet replicators 20 or source routers 22, the data stream from any of the systems 12, 14, 16 and 18 can be sent through the backup connection to another multicast packet replica 20 and to an alternate source router. While systems 12 and 16 each have a primary and a backup network port, systems 14 and 18 have a primary, a backup and foldover network ports. In the event of a failure, for example, of system 16 the tasks undertaken by that system would be folded over to system 12 and transmitted using the primary network port of system 12 along with the data normally generated by system 12. The backup ports on systems 12 and 16 are used in the event of a failure of the primary port. In the event of a system failure of system 18, the functions of system 18 would be taken up by system 14 and the data generated would be provided to the network foldover port provided on computer 14 while the primary function and backup ports of computer 14 would continue to provide their normal primary function and provide the backup function for both the primary and foldover network ports. The system as illustrated includes two source routers at each site for providing further redundancy in routing the data stream distributed by each site.

In some instances where subscribers to a data service receive the redundant stream A and stream B data through different receiving ports in a user network, an anomalous behavior can occur which prevents the systems from simultaneously receiving the redundant data streams. Referring to FIG. 2 there is shown a data network of user 26 having two network ports 32 and 36 respectively receiving data stream 30 from site A and data stream 34 from site B. Network ports 32 and 36, are preferably located at Sites A and B respectively. Receiving ports 32 and 36 of system 26 interact with distribution routers 24A and 24B following a Distance Vector Multicast Routing Protocol (DVRP), which in some cases controls the receiving ports 32 and 36 to only receive data stream 30 via receiving port 32. It is an object of the present invention to eliminate such anomalous behavior and provide a system which transmits two data steams, both of which can be received by a user network using the DVMRP protocol

SUMMARY OF THE INVENTION

According to the invention there is provided an improvement in a system for electronically distributing data via first and second redundant data distribution facilities, wherein replicating apparatus receives original data packets and provides output first and second data packets for distribution through the first and second data distribution facilities. According to the invention, the replicating apparatus provides the first and second data packets via first and second network interfaces, such that the first and second data packets have different source address data corresponding to the first and second network interfaces.

In a preferred arrangement the first and second data packets are provided via first and second source routers coupled to the first and second network interfaces.

For a better understanding of the present invention, together with other and further objects thereof, reference is made to the following description, taken in conjunction with the accompanying drawings, and its scope will be pointed out in the appended claims.

BRIEF DESCRIPTIONS OF THE DRAWINGS

DESCRIPTION OF THE INVENTION

Figure 1:
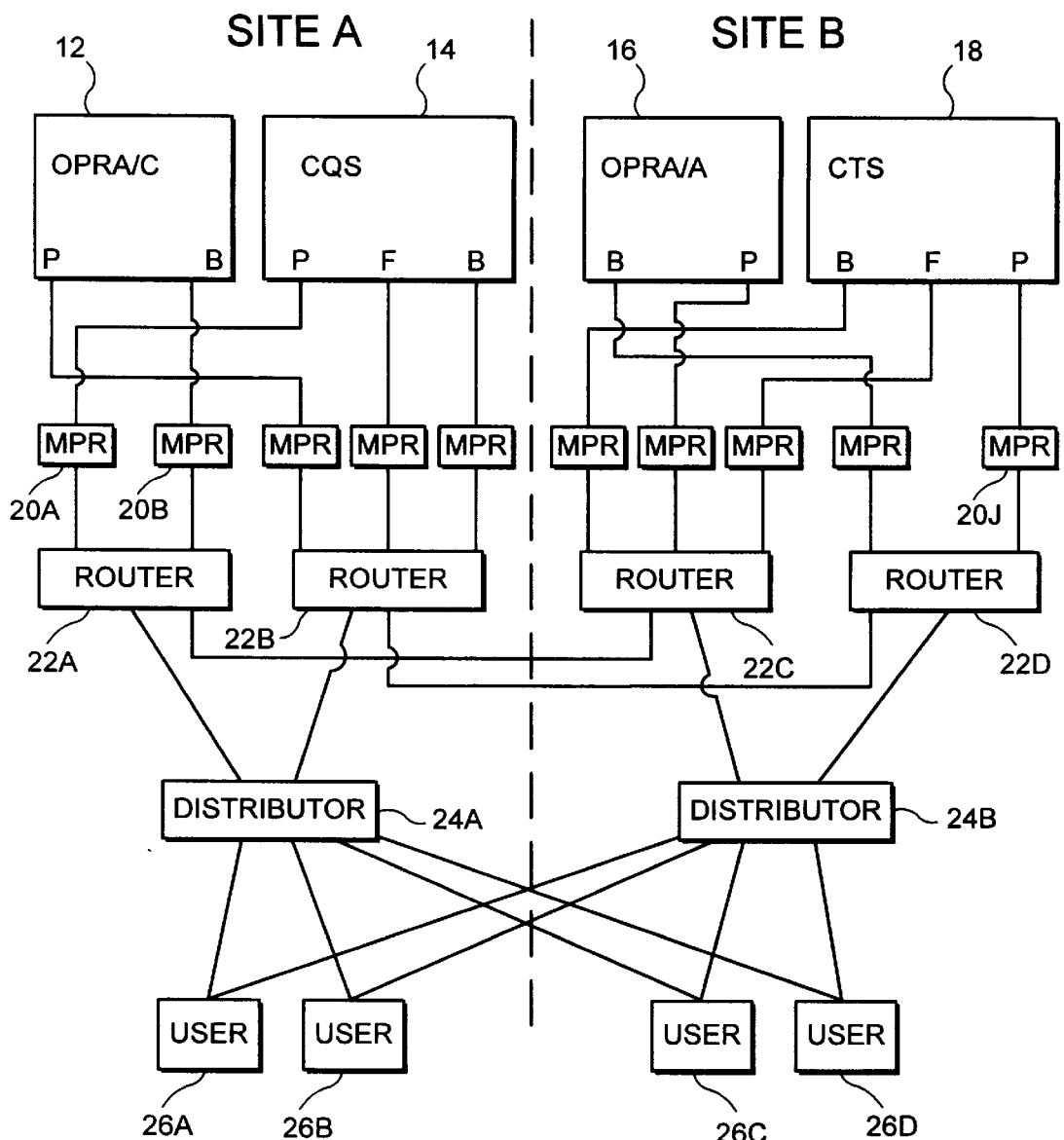
FIG. 1 is a market data distribution system in accordance with the prior art.
Figure 2:
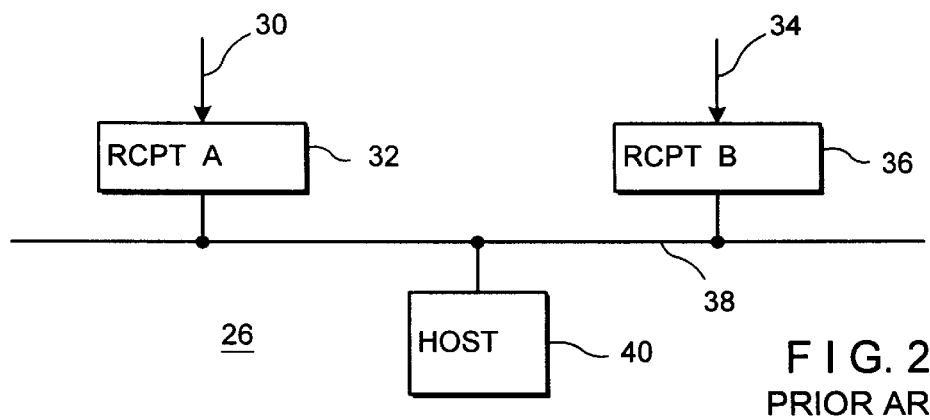
FIG. 2 is a simplified diagram of a user network in accordance with the prior art.

The present inventors have discovered that the problems which give rise to a failure of certain user networks to successfully receive and process the two redundant data streams, as described above, arises out of the fact that the multicast packet replicators 20, which provide the redundant data packets to the source routers 22, provide both the data A and the data B packets through the same local area network interface of the multicast packet replicator. Since both data packets originate from the identical local area network interface, they both are identified by the same packet source address in the data packet as sent through the distribution system to the end users. The interaction of receiver ports 32 and 36 with their respective distribution routers 24A and 24B, following the DVMRP protocol, prevents messages from the same source address from being propagated to the user host 40 following two network paths, the protocol being effective to only allow transmissions using the data path having the shortest reverse flow routing path. This phenomena results in a failure to receive the data stream through the receiving port having the longer reverse path route to the source address, such as data stream 34. Accordingly, only one data stream, such as data stream 30, is transmitted over the networks and made available to host 40.

Figure 3:
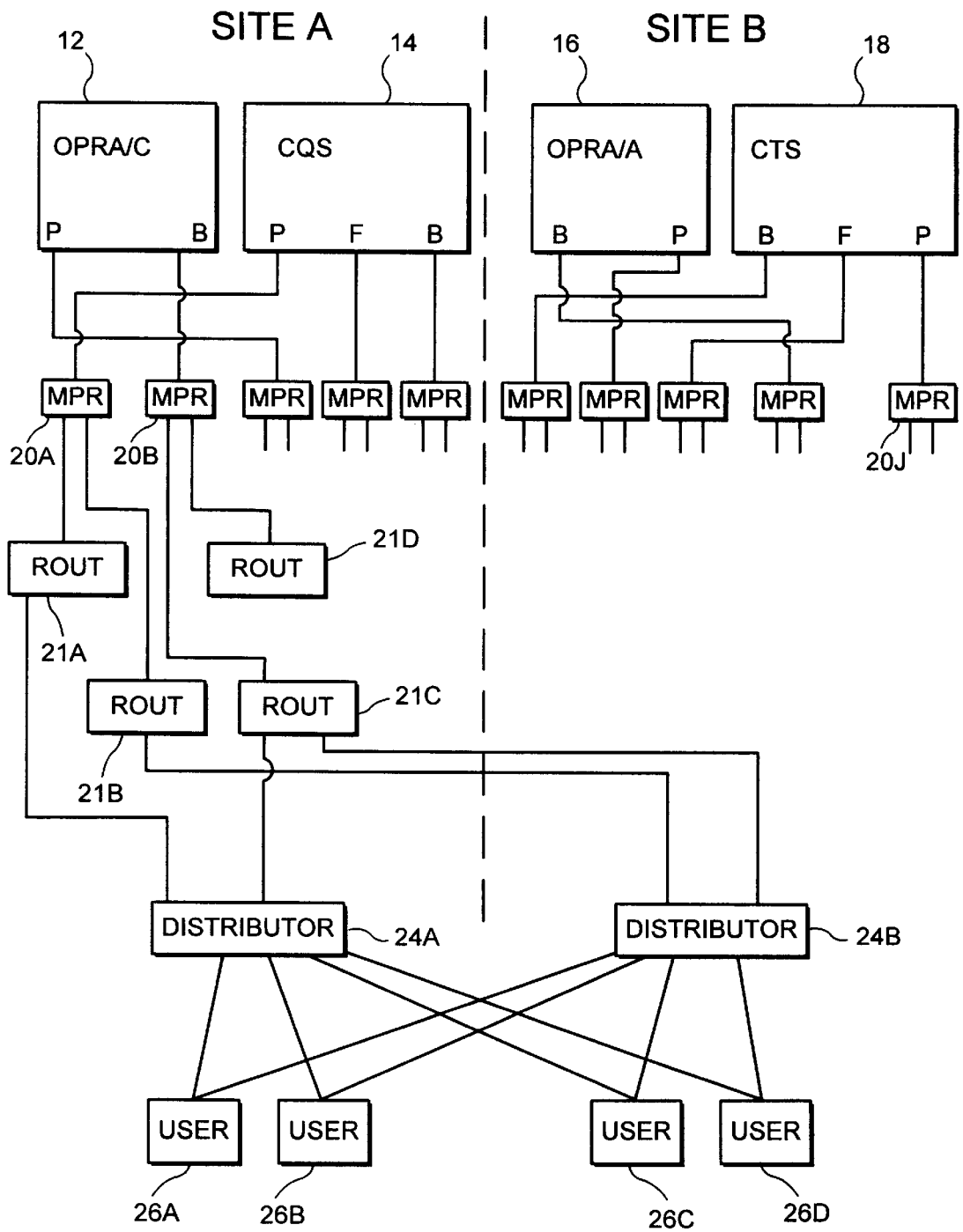
FIG. 3 is a block diagram showing an improved multicast data distribution system in accordance with the present invention.

The inventors have accordingly provided an additional local area network interface on the multicast packet replicators 20, as shown in FIG. 3. Each of the multicast packet replicators are connected to the local area network through two LAN interfaces, which are connected to two source routers 21A, 21B, and thereafter routed for distribution through data stream A and data stream B. The result of this arrangement is that the A and B data stream packets have different packet origination addresses, and when they are propagated through distribution routers 24A and 24B and receiving ports 42 and 36, the DVMRP protocol will not attempt to prevent reception of data on one of the reception ports 32 or 36.

An example of the improved system of the invention is shown in FIG. 3. Each multicast packet replicator 20 is provided with first and second local area network interfaces connected to separate source routers 21. For example the first local area network interface port of multicast packet replicator 20A is connected to source router 21A and the second local area network interface port of multicast packet replicator 20A is connected to source router 21B. Source router 21A is connected to site A distribution router 24A, while source router 21B is connected to distribution router 24B at site B.

The replicated data packets are each provided with a source address unique to the corresponding local area network port of the multicast packet replicator through which it is provided. Accordingly, the A and B data streams as received by the receiving ports 32, 36 of a user's network 26, will have different source addresses and the anomalous behavior under the DVMRP protocol will be avoided.

Version 12.X of the Bay Networks router codes provides configurable DVMRP Outbound Policies. Using these policies the routers can be configured with a set of rules that control DVMRP routing advertisements based on source network numbers. Therefore the distribution router 24A at site A is configured to "hide" B group source network information from the recipient routers connected to site A. Conversely the site B distribution router can "hide" the A group source network information from the recipient routers connected to site B.

The result is that the recipient networks will only be able to receive the A groups via their site A connections and the B groups from their site B connections.

While there has been described what is believed to be the preferred embodiment of the present invention, those skilled in the art will recognize that other and further changes and modifications may be made thereto without departing from the true spirit of the invention, and it is intended to claim all such changes and modifications as fall within the true scope of the invention.

We claim:

1. In a system for electronically distributing data via first and second redundant data distribution facilities, wherein there is provided replicating apparatus for receiving original data packets and providing an output of first and second data packets for distribution through said first and second data distribution facilities, the improvement wherein said replicating apparatus provides said first and second data packets via first and second network interfaces, such that said first and second data packets have different source address data corresponding to said first and second network interfaces, to allow reception of both said first and second data packets.

2. The improvement specified in claim 1 wherein said first and second data packets are provided via first and second source routers coupled to said first and second network interfaces.

3. The improvement specified in claim 2 wherein said first and second network interfaces comprise local area network interfaces.

4. The improvement specified in claim 2 wherein said replicating apparatus comprises multicast packet replicators.

5. The improvement specified in claim 3 wherein said replicating apparatus comprises multicast packet replicators.

* * * * *